US007233920B1

(12) United States Patent
Rodriguez, Jr. et al.

(10) Patent No.: US 7,233,920 B1
(45) Date of Patent: Jun. 19, 2007

(54) SYSTEM AND APPARATUS FOR CREDIT TRANSACTION DATA TRANSMISSION

(75) Inventors: Alan F. Rodriguez, Jr., Dallas, TX (US); Christopher W. Cross, Arlington, TX (US); Dorwin Shields, Jr., Dallas, TX (US); David T. Meckenstock, Missouri City, TX (US)

(73) Assignee: Paymentech, L.P., Dallas, TX (US)

( * ) Notice: Subject to any disclaimer, the term of this patent is extended or adjusted under 35 U.S.C. 154(b) by 1257 days.

(21) Appl. No.: 09/656,815

(22) Filed: Sep. 7, 2000

(51) Int. Cl.
*G06Q 40/00* (2006.01)
*G06Q 99/00* (2006.01)

(52) U.S. Cl. .............................. 705/35; 705/1; 705/38; 705/39; 705/64

(58) Field of Classification Search ............ 705/37–39, 705/35, 1, 64; 709/217, 223
See application file for complete search history.

(56) References Cited

U.S. PATENT DOCUMENTS

| | | | | |
|---|---|---|---|---|
| 4,755,940 A | | 7/1988 | Brachtl et al. ............... 364/408 |
| 4,843,220 A | * | 6/1989 | Haun ........................ 235/380 |
| 5,448,047 A | * | 9/1995 | Nair et al. .................. 235/440 |
| 5,490,251 A | * | 2/1996 | Clark et al. ................. 709/237 |
| 5,500,890 A | * | 3/1996 | Rogge et al. ............. 379/91.02 |
| 5,678,010 A | | 10/1997 | Pittenger et al. ............ 395/244 |
| 5,734,823 A | | 3/1998 | Saigh et al. ........... 395/200.06 |
| 5,742,845 A | | 4/1998 | Wagner ....................... 395/831 |
| 5,754,772 A | | 5/1998 | Leaf ....................... 395/200.33 |
| 5,778,173 A | * | 7/1998 | Apte ........................ 713/201 |
| 5,781,632 A | | 7/1998 | Odom ........................ 380/24 |
| 5,812,668 A | | 9/1998 | Weber ........................ 380/24 |
| 5,845,267 A | | 12/1998 | Ronen ........................ 705/40 |
| 5,848,161 A | | 12/1998 | Luneau et al. ................ 380/49 |
| 5,917,913 A | * | 6/1999 | Wang .......................... 705/67 |
| 5,931,917 A | | 8/1999 | Nguyen et al. ............. 709/250 |
| 5,963,924 A | * | 10/1999 | Williams et al. .............. 705/40 |
| 5,983,208 A | | 11/1999 | Haller et al. ................. 705/40 |
| 5,987,140 A | | 11/1999 | Rowney et al. ............... 380/49 |
| 6,003,008 A | | 12/1999 | Postrel et al. ................. 705/4 |

(Continued)

FOREIGN PATENT DOCUMENTS

EP     858201 A2 * 12/1998

(Continued)

OTHER PUBLICATIONS

Socka, George; "EDI meets the Internet"; CMA Magazine; V70n5; Jun. 1996; pp. 1-4.*

*Primary Examiner*—Ella Colbert
(74) *Attorney, Agent, or Firm*—Jackson Walker L.L.P.; Christopher J. Rourk

(57) ABSTRACT

A system for transmitting credit transaction data, such as an authorization request, is provided. The system includes a remote hub system that is connected to a communications medium, such as the Internet. The remote hub system receives credit transaction data, such as an authorization request, a credit card number, and a transaction amount, from one or more point of sale systems, such as credit card authorization terminals. The remote hub system then encrypts the credit transaction data, and transmits the encrypted credit transaction data over the Internet to a gateway system. The gateway system decrypts the encrypted credit transaction data and transmits the credit transaction data to an authorization system.

8 Claims, 5 Drawing Sheets

U.S. PATENT DOCUMENTS

| | | | | |
|---|---|---|---|---|
| 6,005,939 | A | 12/1999 | Fortenberry et al. | 380/21 |
| 6,032,137 | A * | 2/2000 | Ballard | 705/75 |
| 6,064,988 | A * | 5/2000 | Thomas | 705/44 |
| 6,157,927 | A * | 12/2000 | Schaefer et al. | 707/103 R |
| 6,163,772 | A * | 12/2000 | Kramer et al. | 705/79 |
| 6,178,409 | B1 * | 1/2001 | Weber et al. | 705/79 |
| 6,460,020 | B1 * | 10/2002 | Pool et al. | 705/26 |
| 6,546,441 | B1 * | 4/2003 | Lum | 710/72 |
| 6,601,040 | B1 * | 7/2003 | Kolls | 705/14 |
| 6,640,214 | B1 * | 10/2003 | Nambudiri et al. | 705/26 |

FOREIGN PATENT DOCUMENTS

JP  02000293577 A * 10/2000

* cited by examiner

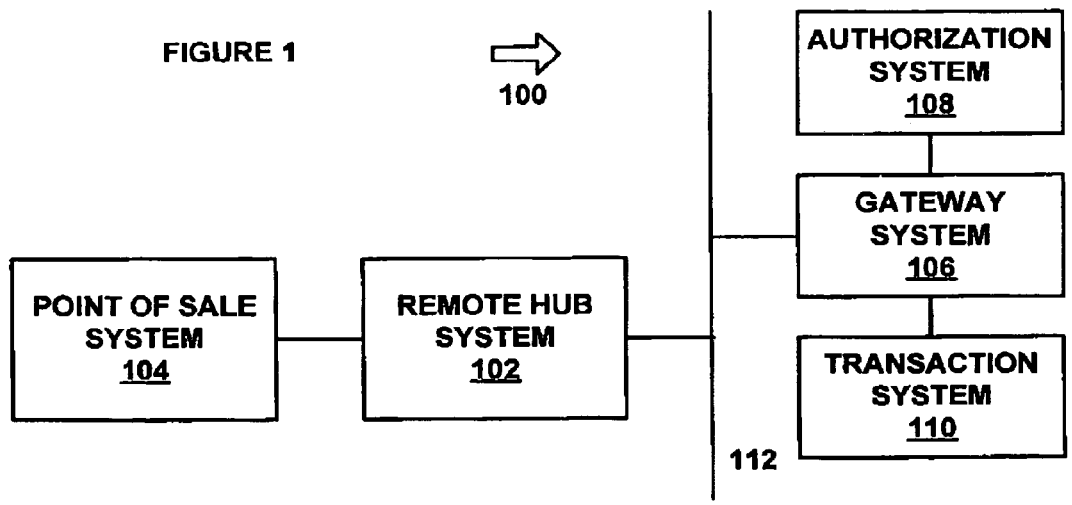
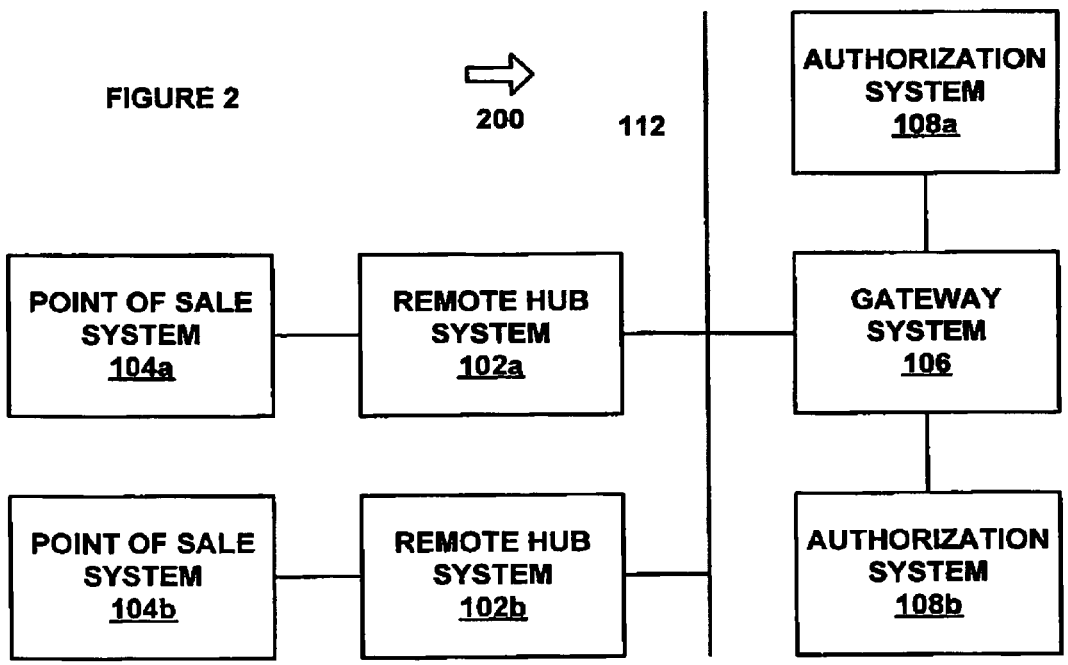

_US 7,233,920 B1_

SYSTEM AND APPARATUS FOR CREDIT TRANSACTION DATA TRANSMISSION

FIELD OF THE INVENTION

The present invention pertains to the field of payment data processing. More specifically, the invention relates to a system and apparatus for transmitting credit transaction data that allows the credit transaction data to be transmitted over a communications medium.

BACKGROUND

Electronic payment systems are used to receive credit and other electronic payment data and to transfer an authorization request that includes the credit transaction data to an authorization system. The authorization system then verifies whether the form and amount of payment is valid, and an authorization code is generated for transmission to the point of sale that authorizes the transaction, denies the transaction, notifies the operator or potential criminal activity, or provides other suitable data. In this manner, fraudulent activities using electronic payment on credit cards can be minimized.

Current authorization systems utilize the public switched telephone network for authorization. The point of sale terminal must establish a telephone connection with the authorization host, such as by a dial-up connection or by using a leased line with a permanent connection. Such connections through the public switched telephone network or through leased lines are expensive to maintain, and may experience communications failure.

A second method by which point of sale terminals may be connected with an authorization host is through the Internet or other online communications media through a virtual private network device. The virtual private network device encodes data received from the point of sale terminals and then decodes the data at the authorization host. Such virtual private network devices cannot be remotely programmed, are typically made from hardware or otherwise not designed to be updated with new programming, and do not provide communications from the authorization system to the point of sale system, such as to determine the status of point of sale system. In addition, such virtual private network devices are not compatible with standard network architecture and must be installed outside of the network firewall. In addition, failure of the virtual private network device can result in communications failure.

Thus, while credit transaction authorization is presently performed over communications media, such authorization either is at high cost, in that it requires connections to be made over the public switched telephone network, or in that it requires expensive virtual private network devices that are not compatible with existing networks and which must be changed out in the event of a security violation. In addition, the credit transaction data that can be transmitted is limited and cannot be readily modified in response to standards changes, technological changes, or for other reasons.

SUMMARY OF THE INVENTION

In accordance with the present invention, a system and apparatus for transmitting credit transaction data are provided that overcome known problems with transmitting credit transaction data.

In particular, a system and apparatus for transmitting credit transaction data are provided that allow credit transaction data to be transmitted over the Internet or other communications media, by allowing the encryption procedures used on the credit transaction data to be readily updated so as to protect system security.

In accordance with an exemplary embodiment of the present invention, a system for transmitting credit transaction data, such as credit card data, account number data, vendor number data, user identification data, password data, PIN number data, an authorization request, or other suitable data, is provided. The system includes a remote hub system that is connected to a communications medium, such as the Internet. The remote hub system receives credit transaction data, such as an authorization request, a credit card number, and a transaction amount, from one or more point of sale systems, such as credit card authorization terminals. The remote hub system then encrypts the credit transaction data, and transmits the encrypted credit transaction data over the Internet to a gateway system. The gateway system decrypts the encrypted credit transaction data and transmits the credit transaction data to an authorization system.

The present invention provides many important technical advantages. One important technical advantage of the present invention is a system and apparatus for transmitting credit transaction data that allows the encryption procedure to be readily modified. The present invention thus allows the Internet or other unsecured communications media to be used to transmit credit transaction data by allowing encryption procedures that are used to maintain the security of the credit transaction data to be readily updated.

Those skilled in the art will further appreciate the advantages and superior features of the invention together with other important aspects thereof on reading the detailed description that follows in conjunction with the drawings.

BRIEF DESCRIPTION OF THE DRAWINGS

FIG. 1 is a diagram of a system for providing online credit transaction data transmission in accordance with an exemplary embodiment of the present invention;

FIG. 2 is a diagram of a system for transmitting credit transaction data from multiple point of sale terminals to multiple authorization systems in accordance with an exemplary embodiment of the present invention;

DETAILED DESCRIPTION OF PREFERRED EMBODIMENTS

Figure 3:
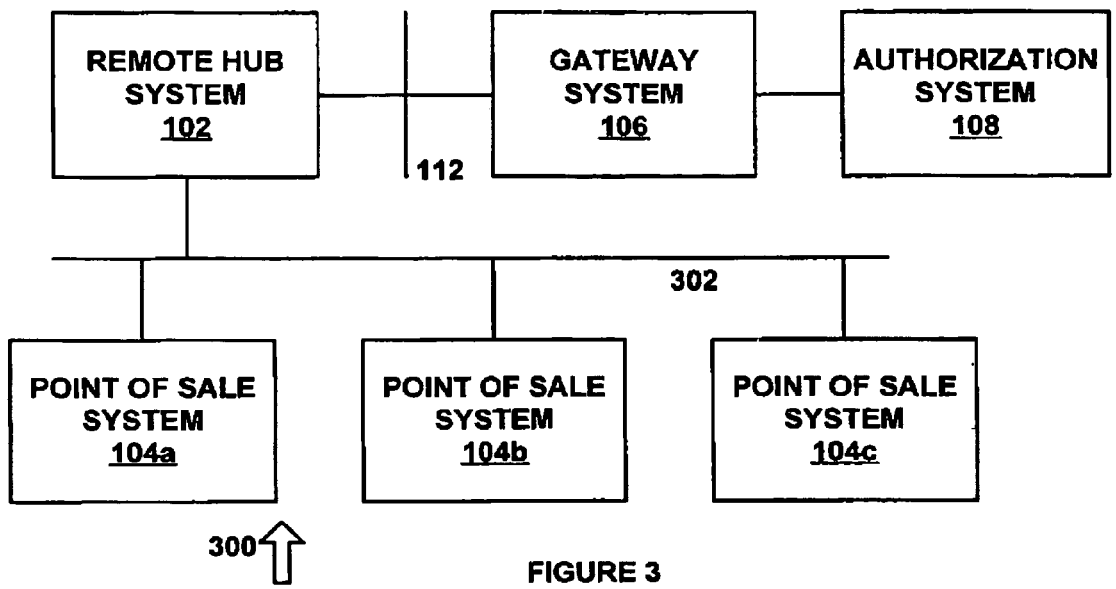
FIG. 3 is a diagram of a system for transmitting credit transaction data over a communications medium in accordance with an exemplary embodiment of the present invention.

In the description which follows, like parts are marked throughout the specification and drawings with the same reference numerals, respectively. The drawing figures may not be to scale and certain components can be shown in generalized or schematic form and identified by commercial designations in the interest of clarity and conciseness.

FIG. 1 is a diagram of a system 100 for providing online credit transaction data transmission in accordance with an exemplary embodiment of the present invention. System 100 allows credit to be transferred over a public communications medium, such as the Internet, and allows the credit transaction data to be encrypted in a manner that allows the encryption mechanism to be modified or updated as needed.

System 100 includes remote hub system 102. Remote hub system 102 can be implemented in hardware, software, or a suitable combination of hardware, and can be one or more software systems operating on a Single Board Computer ("SBC") manufactured by EMAC, Inc. of Carbondale, Ill., an Ericsson eBox Model 101, or other suitable Open Services Gateway Initiative (OSGI) compliant appliances. As used herein, a software system can include one or more lines of code, objects, agents, subroutines, one or more lines of code operating in two or more different software programs, two or more separate software programs, or other suitable software architectures. In one exemplary embodiment, a software system can include one or more lines of code or other suitable software structures operating in a general purpose competing program, such as an operating system, and one or more lines of code or other suitable software structures operating in a specific purpose software application.

Remote hub system 102 receives credit transaction data from point of sale system 104 in accordance with a predetermined data transmission protocol, such as the ISO 8583 protocol, the VISA-K protocol, or other suitable protocols. The credit transaction data can also include Electronic Data Interchange (EDI) format data, credit card data, account number data, vendor number data, user identification data, password data, PIN number data, an authorization request, or other suitable data. Remote hub system 102 then encrypts the credit transaction data, and transmits the credit transaction data as an authorization request over a communications medium 112 to gateway system 106. Authorization data is then received at remote hub system 102 from an authorization system through gateway system 106, and is transmitted to the point of sale system 104 by remote hub system 102.

Remote hub system 102 can also receive data from gateway system 106 through communications medium 112, such as data that can be used to control the operation of remote hub system 102, requests for status, or other suitable data. Remote hub system 102 can use a data format that is amenable for transmission through local area network or wide area network firewalls, such as HyperText Transfer Protocol ("HTTP") format data, extensible Markup Language (XML), or other format data, such that remote hub system 102 can be installed at any point within a network without consideration for the location of that position in regards to the network firewall.

Point of sale system 104 is coupled to remote hub system 102, and can be implemented in hardware, software, or a suitable combination of hardware and software, and can be one or more software systems operating on a point of sale terminal or device. As used herein, the term "couple" and its cognate terms, such as "couples" and "coupled," can include a physical connection (such as a copper conductor), a virtual connection (such as through randomly assigned memory locations of a data memory device), a logical connection (such as through logical devices of a semiconducting circuit), a combination of such connections, or other suitable connections. In one exemplary embodiment, systems and components are coupled to other systems and components through intervening systems and components, such as through an operating system of a processor platform.

Point of sale system 104 can receive credit transaction data from a magnetic stripe of a credit card, data entered by a user through a terminal, or other suitable forms of credit or electronic payment data, and can transmit the data to remote hub system 102 in a suitable format. Point of sale system 104 also receives authorization data from an authorization system through remote hub system 102, and uses the authorization data to determine whether to accept or reject a credit or electronic payment transaction.

Gateway system 106 can be implemented in hardware, software, or a suitable combination of software and hardware, and can be one or more software systems operating on a general-purpose server platform. Gateway system 106 receives encrypted credit transaction data from remote hub system 102 over communications medium 112 and converts the encrypted credit transaction data into credit transaction data in a format suitable for transmission to authorization system 108. Gateway system 106 can also transmit data to remote hub system 102, such as data requesting the status of remote hub system 102 or point of sale system 104, protocol modules for updating the credit transaction data format protocols used by remote hub system 102, encryption modules for updating the encryption process used by remote hub system 102, and other suitable data. Gateway system 106 can also interface with multiple authorization systems 108, such that data received from remote hub system 102 can be routed to a suitable authorization system.

Authorization system 108 can be implemented in hardware, software, or a suitable combination of hardware and software, and can be one or more software systems operating on a general-purpose server platform. Authorization system 108 receives credit transaction data from gateway system 106 and performs an authorization analysis on the credit transaction data. In one exemplary embodiment, authorization system 108 checks a credit card number against a list of reported stolen credit card numbers, a list of credit card numbers that are over their credit limit, and a list of credit card numbers for which monitoring of the credit card has been initiated. Authorization system 108 then transmits suitable data to gateway system 106, such as a code authorizing or denying the use of the credit card for the credit transaction.

Transaction system 110 can be implemented in hardware, software, or a suitable combination of hardware and software, and can be one or more software systems operating on a general-purpose server platform. Transaction system 110 receives credit transaction data from gateway system 106 and performs credit transaction processing. In one exemplary embodiment, transaction system 110 obtains historical data, account data, or other suitable data for a merchant pertaining to one or more credit transactions.

Communications medium 112 is coupled to remote hub system 102 and gateway system 106 and allows communications to flow between remote hub system 102 and gateway system 106. In one exemplary embodiment, communications medium 112 is the Internet, but can also or alternatively include a local area network, a wide area network, a wireless network, the public switched telephone network, a suitable combination of such media, or other suitable communications media. In another exemplary embodiment, communications medium 112 is the Internet and also includes a connection through the public switched telephone network that can be used in the event that the Internet is unavailable.

In operation, system 100 is used to transmit credit transaction data over an open, online communications medium, such as the Internet, a local area network, a wide area network, a wireless network, or other suitable communications media. System 100 allows credit transaction data received from a point of sale terminal to be encrypted before transmission over the open communications medium, and decrypted when the credit transaction data is received at a gateway. The encryption mechanism can be updated as needed in order to prevent unauthorized persons from decrypting or otherwise determining how to access the encrypted data.

System 100 further allows remote hub system 102 to interface with point-of-sale devices and other devices so as to recognize the device and set configuration parameters to allow the point-of-sale devices and other devices to communicate with the transaction systems, authorization systems, and other systems, so as to allow point of sale devices and other devices that were not previously able to communicate over the Internet, to receive and transmit data to these systems. Any non-HTTP-based communications protocol used by such devices, such as email, socket connections, File Transfer Protocol (FTP), any TCP/IP protocol that isn't inherently securable, and other protocols can be accommodated.

FIG. 2 is a diagram of system 200 for transmitting credit transaction data from multiple point of sale terminals to multiple authorization systems or transaction systems in accordance with an exemplary embodiment of the present invention. System 200 allows multiple authorization systems and transaction systems to connect to one or more remote hub systems through a public online communications medium or other suitable communications media. In the exemplary embodiment shown in FIG. 2, two authorization systems only are shown, but system 200 can also be used with three or more authorization systems, one or more transaction systems, and a suitable combination of authorization systems and transaction systems.

System 200 includes remote hub systems 102a and 102b, which are coupled to point of sale systems 104a and 104b, respectively. Gateway system 106 of system 200 is coupled to authorization systems 108a and 108b. In the exemplary embodiment shown in FIG. 2, point of sale system 104a can interface with authorization system 108a through remote hub system 102a and gateway system 106. Likewise, point of sale system 104b can interface with authorization system 108b through remote hub system 102b. Gateway system 106 can receive the encrypted credit transaction data from remote hub system 102a and remote hub system 102b, and can decrypt the data and determine whether the encrypted data should be transmitted to authorization system 108a or authorization system 108b. In this manner, a single gateway system can be used to connect to two or more authorization systems for use by multiple remote hub systems and point of sale systems.

FIG. 3 is a diagram of a system 300 for transmitting credit transaction data over a communications medium in accordance with an exemplary embodiment of the present invention. System 300 allows data from two or more point of sale systems to be transmitted to one or more authorization systems or transaction systems through a single remote hub system. In the exemplary embodiment shown in FIG. 3, an authorization system only is shown, but system 300 can also be used with two or more authorization systems, one or more transaction systems, and a suitable combination of authorization systems and transaction systems.

System 300 includes remote hub system 102, which is coupled to point of sale systems 104a, 104b and 104c through communications medium 302. Communications medium 302 can be a local area network, a wide area network, individual hard-wired connections to each point of sale system, a wireless network, or other suitable communications media. Remote hub system 102 can transmit and receive data from each of point of sale systems 104a, 104b, and 104c, such as through use of an Ethernet communications protocol, a token ring communications protocol, direct communications to each terminal, or other suitable protocols.

Remote hub system 102 can then transmit the data received from point of sale systems 104a, 104b, 104c to gateway system 106 for subsequent transmission to authorization system 108. Likewise, multiple authorization systems can be connected to gateway system 106, such that point of sale system 104a can transmit credit transaction data to a first authorization system, point of sale system 104b can transmit credit transaction data to a second authorization system, and other suitable transmissions can be made. In this manner, a single remote hub system can couple a plurality of point of sale systems to one or more authorization systems through a single communications medium 112.

Likewise, remote hub system 102 can receive authorization data from one or more authorization systems 108 through one or more gateway systems 106, and can route the authorization data to the corresponding point of sale system 104a, 104b, or 104c for which the authorization data has been generated. Remote hub system 102 includes routing functionality that allows the credit transaction data received from a point of sale terminal to be matched with the corresponding authorization data received from an authorization system 108. In one exemplary embodiment, remote hub system 102 maps address data to each credit transaction data message that identifies the point of sale systems 104a, 104b, or 104c that the credit transaction data was received from. This address data map is then used to route the authorization data received from the authorization system 108 to the correct point of sale system 104a, 104b, or 104c. Other suitable procedures can also be used.

Figure 4:
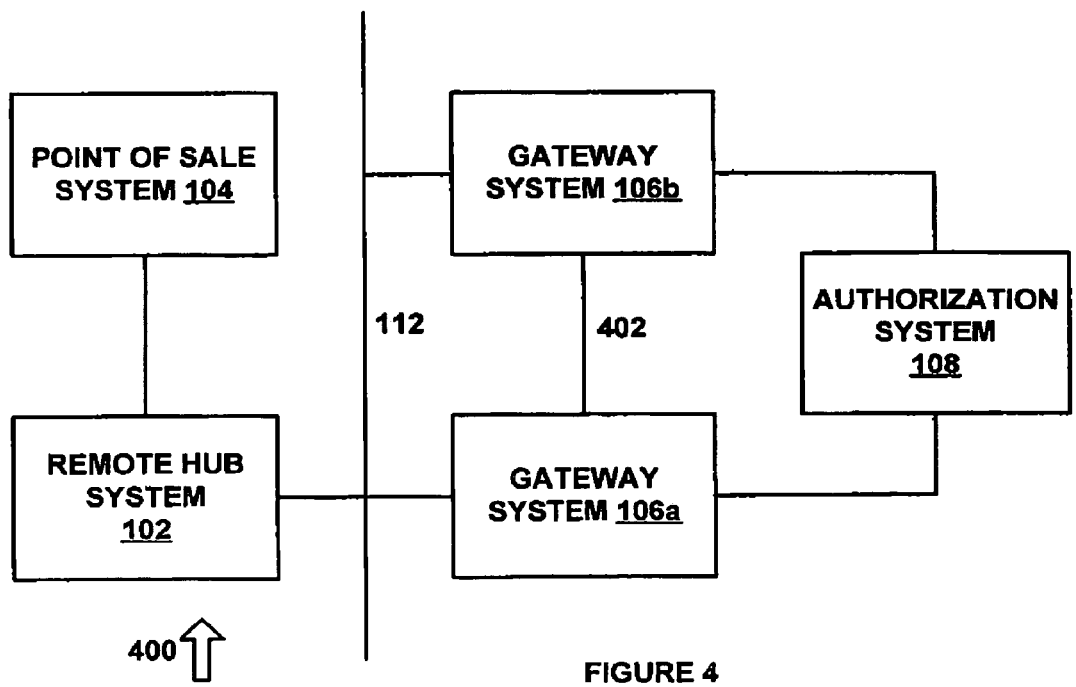
FIG. 4 is a diagram of a system for transmitting credit transaction data in accordance with an exemplary embodiment of the present invention.

FIG. 4 is a diagram of a system 400 for transmitting credit transaction data in accordance with an exemplary embodiment of the present invention. System 400 allows two or more gateway systems to transmit credit transaction data from a point of sale system to an authorization system, and to transmit the corresponding authorization data to the point of sale system. In the exemplary embodiment shown in FIG. 4, an authorization system only is shown, but system 400 can also be used with two or more authorization systems, one or more transaction systems, and a suitable combination of authorization systems and transaction systems.

System 400 includes gateway systems 106a and 106b which are each coupled to communications medium 112. Likewise, gateway systems 106a and 106b can be coupled to each other through a communications medium 402, which can be the public switched telephone network, a leased line, or other forms of communications. Gateway systems 106a and 106b thus exchange periodic updates and can function as redundant gateway systems for access to authorization system 108.

In operation, system 400 is used to transmit credit transaction data from point of sale system 104 to remote hub system 102 and then to authorization system 108 through either or both of gateway systems 106a and gateway system 106b. Data transmitted from remote hub system 102 over communications medium 112 can be received at either or both of gateway system 106a and 106b. Gateway system 106b can be disabled while gateway system 106a is in operation, or can also be configured to receive information and transmit information redundantly to authorization system 108. In this manner, if either of gateway systems 106a or 106b fail to operate, fail to receive the credit transaction data, or otherwise become unavailable, the credit transaction data is still transferred to authorization system 108 for authorization.

Figure 5:
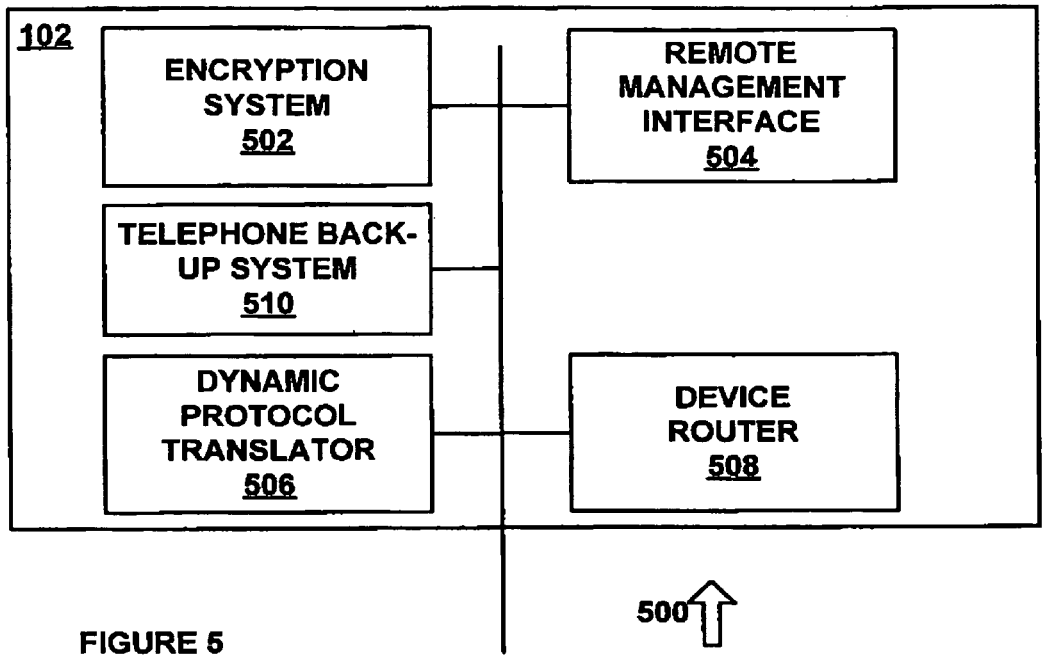
FIG. 5 is a diagram of a system for providing remote hub access to a gateway system in accordance with an exemplary embodiment of the present invention.

FIG. 5 is a diagram of a system 500 for providing remote hub access to a gateway system in accordance with an exemplary embodiment of the present invention. System 500 includes remote hub system 102, encryption system 502, remote management interface 504, dynamic protocol translator 506, device router 508, and telephone backup system 510, each of which can be implemented in hardware, software, or a suitable combination of hardware and software, and which can be one or more software systems operating on a Java virtual machine, such as a Single Board Computer ("SBC") manufactured by EMAC, Inc. of Carbondale, Ill.

Encryption system 502 receives credit transaction data from a point of sale system and encrypts the credit transaction data for transmission over a suitable communications medium, such as the Internet. Encryption system 502 can receive credit transaction data in a first legacy protocol format from the point of sale system, and can extract the credit transaction data for transmission to a gateway system 106. Encryption system 502 then uses an encryption algorithm or other suitable encryption procedures to encrypt the data in a manner that prevents the data from being intercepted by unauthorized third parties. The encrypted data is then transmitted over the communications medium to the gateway system. Encryption system 502 can also receive an encryption module and update the encryption procedure used to encrypt the credit transaction data.

Remote management interface 504 can also receive data messages that have been transmitted from gateway system 106 to system 200 over a suitable communications medium. This data can either be encrypted for decryption by encryption system 502, or can be transmitted in an unencrypted form. Remote management interface 504 then removes header data, format data, and other data from the data message and performs predetermined functions based upon the content of the data message. In one exemplary embodiment, remote management interface 504 can execute code stored within the data message, such as code that installs a dynamic protocol translator module in dynamic protocol translator 506, code that installs an encryption module in encryption system 502, or suitable code.

Dynamic protocol translator 506 receives credit transaction data from a point of sale system 104 based upon one or more standard protocols for the point of sale systems. In one exemplary embodiment, dynamic protocol translator 506 translates ISO 8583 or VISA-K protocol data into a data format suitable for encryption by encryption system 502. Dynamic protocol translator 506 can also receive a protocol module and update the protocol by which it receives the credit transaction data.

Device router 508 can receive and transmit data messages from one or more point of sale systems. Device router 508 is operable to receive credit transaction data from one or more point of sale systems and to transfer the data to dynamic protocol translator 506 or encryption system 502 for subsequent transmission to an authorization server. Likewise, device router 508 can also receive data for one or more point of sale systems 104 from other or dynamic protocol translator 506 or encryption system 502, and can route the encrypted data to the appropriate point of sale system.

Telephone backup system 510 can establish a connection with the gateway system over the public switched telephone network in the event that system 500 is otherwise unable to transmit and receive data messages from the gateway system over a preferred communications medium, such as the Internet. In one exemplary embodiment, telephone backup system 510 establishes a dial-up connection or uses a leased telephone line when no response is received to an authorization request after several attempts over the preferred communications medium.

In operation, system 500 is used to control the operation of an apparatus for encrypting data received from a credit entry device or point of sale system, where credit transaction data is transmitted over a communications medium such as the Internet, such as in the form of an authorization request to a gateway system to an authorization system. System 500 also allows encrypted or unencrypted data messages to be received from the gateway system over the communications medium and to be handled appropriately, such as by updating encryption system 502 with an encryption module, updating dynamic protocol translator 506 with a protocol module, or by other suitable procedures.

System 500 allows credit transaction data to be received from one or more point of sale systems. The credit transaction data is then processed by dynamic protocol translator 506 to extract the credit transaction data. The credit transaction data is then encrypted by an encryption system 502 and is then transmitted to a gateway system. Likewise, system 500 allows data messages to be received from a gateway system 106 by a remote management interface 504, such as status requests, encryption modules, protocol modules, or other suitable data.

Figure 6:
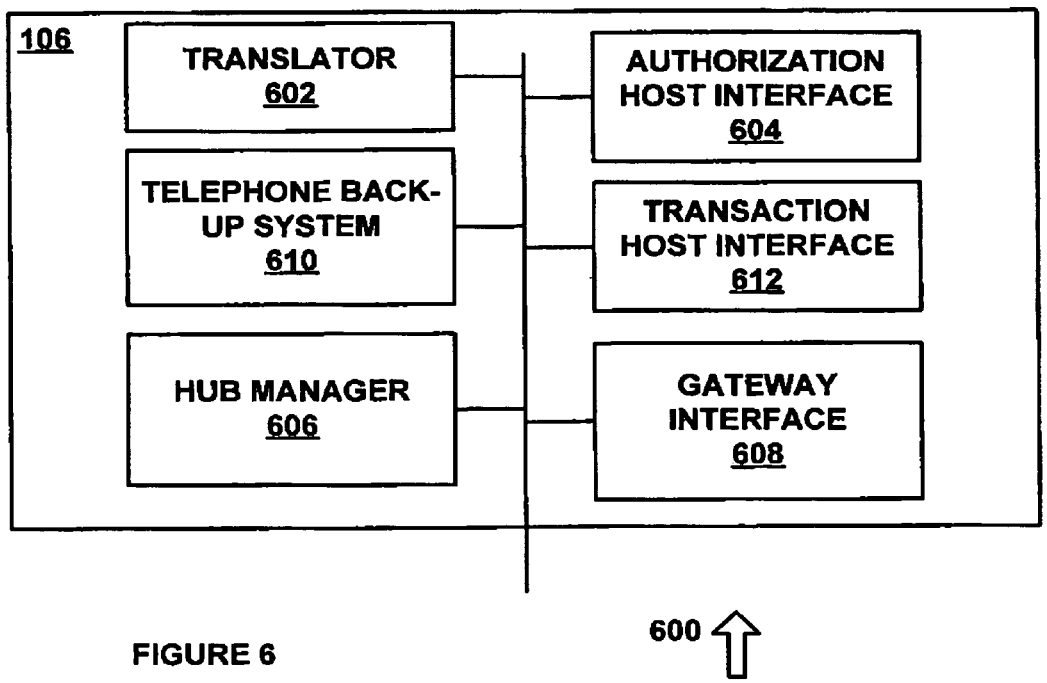
FIG. 6 is a diagram of a system for performing gateway system functions in accordance with an exemplary embodiment of the present invention.

FIG. 6 is a diagram of system 600 for performing gateway system functions in accordance with an exemplary embodiment of the present invention. System 600 includes gateway system 106, translator 602, authorization host interface 604, hub manager 606, gateway interface 608, telephone backup system 610, and transaction host interface 612, each of which can be implemented in hardware, software, or a suitable combination of hardware and software, of which can be one or more software systems operating on a general purpose server platform.

Translator 602 receives encrypted data messages that include credit transaction data, and decrypts the encrypted data. Translator 602 can also receive encryption modules, such that the encryption system can be updated as required to maintain system security. Translator 602 can receive authorization data from an authorization system, and can encrypt the authorization data for subsequent transmission to the remote hub system.

Authorization host interface 604 receives credit transaction data from translator 602 and transmits the credit transaction data to an authorization system. If multiple authorization systems are used, authorization host interface 604 can also determine the appropriate authorization host to transmit the credit transaction data to, such as by using data from a credit card type identifier field, an authorization host identifier field, or other suitable procedures. Authorization host interface 604 can also convert the credit transaction data into a format for use by the authorization system. The authorization response from the authorization host can also be received by authorization host interface 604, and can be transmitted to translator 602, directly to the remote hub system, or to other suitable systems or components.

Hub manager 606 transmits status requests, encryption module updates, protocol module updates, or other suitable data to remote hub systems, and can analyze status data received in response to the status request from the remote hub systems. In one exemplary embodiment, hub manager 606 periodically transmits status requests and encryption modules to remote hub systems, in order to maintain system reliability and system security. Hub manager 606 can transmit status requests and encryption modules in response to operator requests or as otherwise required.

Gateway interface 608 allows system 600 to interface with other gateway systems, such as to allow data about the status of remote hub systems, encryption systems or other data to be coordinated or synchronized between systems 600. In one exemplary embodiment, gateway interface 608 is used to coordinate the encryption module updates and status requests such that conflicting encryption module updates are not made. Gateway interface 608 also allows credit transaction data received at a first gateway to be transmitted to a second gateway in the event the public online communications medium becomes disabled or interrupted.

Telephone backup system 610 can establish a connection with the remote hub systems over the public switched telephone network in the event that system 600 is otherwise unable to transmit and receive data messages from the remote hub systems over a preferred communications medium, such as the Internet. In one exemplary embodiment, telephone backup system 610 establishes a dial-up connection or uses a leased telephone line when no response is received to a message after several attempts over the preferred communications medium.

Transaction host interface 612 receives credit transaction data from translator 602 and transmits the credit transaction data to a transaction system. If multiple transaction systems are used, transaction host interface 612 can also determine the appropriate transaction host to transmit the credit transaction data to, such as by using data from a credit card type identifier field, a transaction host identifier field, or other suitable procedures. Transaction host interface 612 can also convert the credit transaction data into a format for use by the transaction system. Any response from the transaction host can also be received by transaction host interface 612, and can be transmitted to translator 602, directly to the remote hub system, or to other suitable systems or components.

In operation, system 600 allows encrypted credit transaction data to be received and translated for use by authorization systems. System 600 also allows remote hub systems and point of sale systems to be monitored for =problems, and allows protocol updates to be transmitted for use by remote hub systems.

Figure 7:
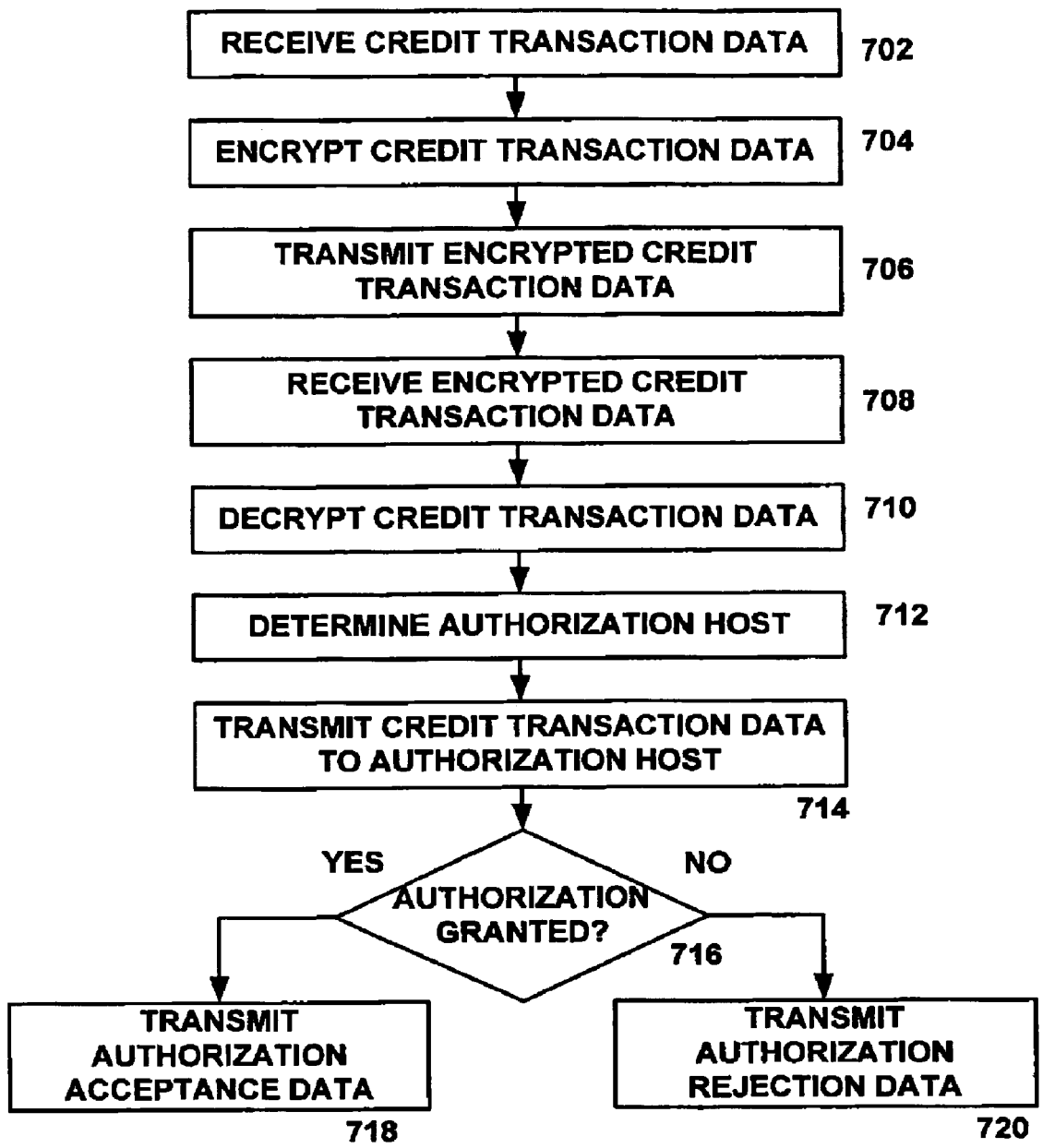
FIG. 7 is a diagram of a method for processing credit transaction data in accordance with an exemplary embodiment of the present invention.

FIG. 7 is a diagram of a method 700 for processing credit transaction data in accordance with an exemplary embodiment of the present invention. Method 700 can be used in conjunction with a remote hub system or other suitable systems.

Method 700 begins at 702 where credit transaction data is received. The credit transaction data can include a credit card number, amount, and other suitable credit transaction data, and can be received in accordance with the ISO 8583 protocol, the VISA-K protocol, or other suitable protocols. If the credit transaction data is received from one of two or more point of sale systems or other devices, then the credit transaction data can be mapped to allow authorization data that is sent in response to an authorization request to be matched with the corresponding point of sale system. The method then proceeds to 704.

At 704, the credit transaction data is assembled into an authorization request and encrypted, such as by using an updateable encryption module of an encryption system. The method then proceeds to 706, where the encrypted authorization request and credit transaction data is transmitted over a suitable communications medium, such as the Internet, a local area network, a wide area network, a wireless network, or other suitable communications media. The encrypted authorization request and credit transaction data can be transmitted in packets, in HTTP format, or by other suitable procedures. The method then proceeds to 708.

At 708, the encrypted authorization request and credit transaction data is received and the method proceeds to 710 where the authorization request and credit transaction data is decrypted. In one exemplary embodiment, the encrypted authorization request and credit transaction data is received at a gateway system and a decryption method is used that is coordinated with the encryption method used at a remote hub system. The method then proceeds to 712.

At 712, an authorization host for the authorization request and credit transaction data is determined. For example, an authorization request and credit transaction data may be received for one or more credit card issuing organizations, such as a Visa card, a MasterCard, an American Express card, or other suitable credit cards. Each of these credit card issuing organizations may have its own authorization host, or a single authorization host can be used that performs authorization services in lieu of the issuing card organization. After the authorization host is determined at 712, the method proceeds to 714 where the authorization request and the credit transaction data is transmitted to the authorization host for authorization. The method then proceeds to 716.

At 716, it is determined whether authorization has been granted. If authorization has been granted, the method proceeds to 718 where credit authorization data is transmitted to the point of sale system, such as by transmitting through a gateway system to a remote hub system, and then by using mapped authorization request and credit transaction data to identify the point of sale system to which the authorization data should be transmitted. If it is determined at 716 that authorization has been denied, the method proceeds to 720 where a data message is transmitted to the point of sale system that instructs the operator that the credit transaction has been denied. Likewise, additional data such as theft warning data can be transmitted.

An operation, method 700 allows authorization requests and credit transaction data to be transmitted over a communications medium in a manner that allows the data to be encrypted and the encryption mechanism to be changed. Method 700 allows multiple authorization systems and remote hub systems to be coupled through a single gateway system.

Figure 8:
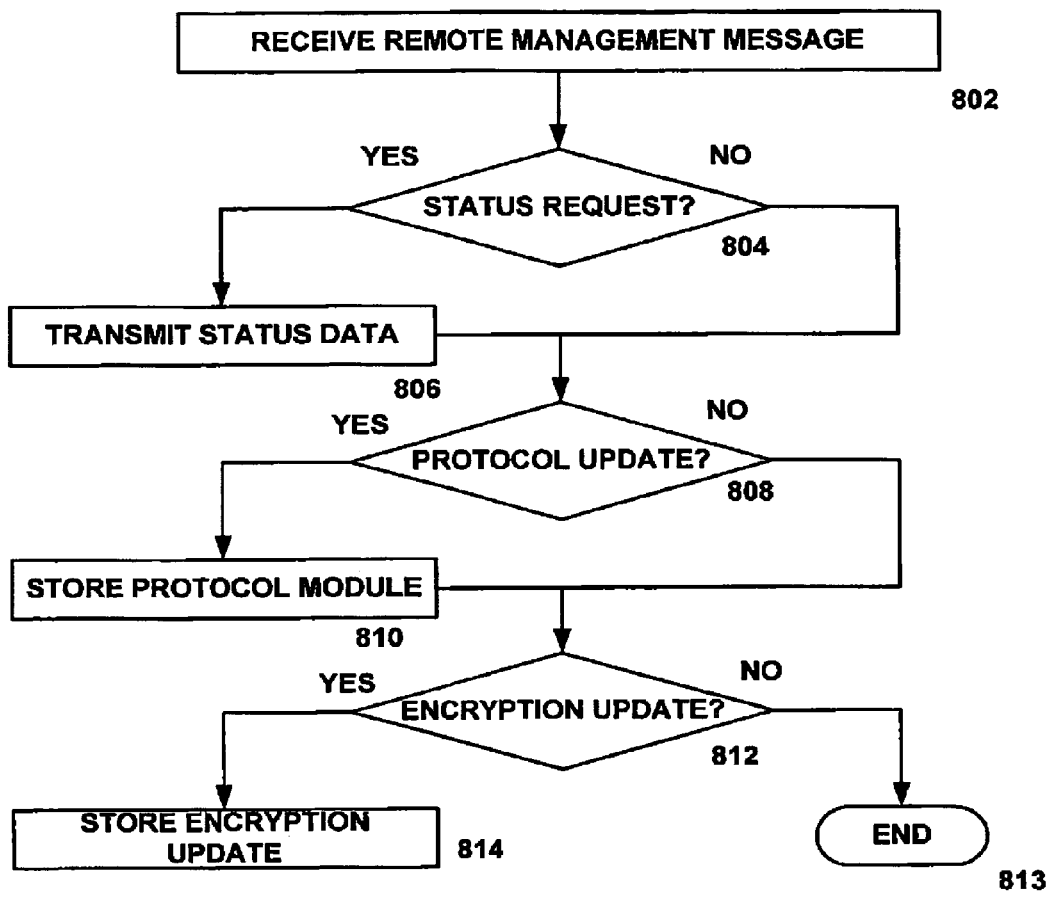
FIG. 8 is a diagram of a method for processing remote management messages in accordance with an exemplary embodiment of the present invention.

FIG. 8 is a diagram of a method 800 for processing remote management messages in accordance with an exemplary embodiment of the present invention. Method 800 begins at 802 where a remote management message is received, such as at a remote hub system. The method then proceeds to 806 where it is determined whether a status request has been received. If a status request has been received at 804 the method proceeds to 806 where status data is obtained and transmitted. In one exemplary embodiment, the status data can include status data for a remote hub system and one or more point of sale systems coupled to the remote hub system, such as operability state data, encryption module data, protocol module data, terminal setup data, historical data such as the number of authorization requests for which a telephone backup system was used, and other suitable data. The method then proceeds to 808. Likewise, if it is determined at 804 that a status request has not been received, the method proceeds directly to 808.

At 808, it is determined whether a protocol update has been received. If no protocol update has been received, the method proceeds to 812, otherwise the method proceeds to 810 where the protocol module is stored in a suitable dynamic protocol translator system, such as one that is used to control the transmission of credit transaction data to and from a point of sale system. The method then proceeds to 812.

At 812, it is determined whether an encryption module update has been received. The encryption module update can be used to modify an encryption system so as to maintain system security. If it is determined that an encryption module update has been received at 812 the method proceeds to 814 where the encryption module update is stored in a suitable encryption system. Otherwise, the method proceeds to 813 and terminates.

In operation, method 800 allows remote hub management messages to be transmitted from a gateway system to a remote hub system to facilitate the transmission of encrypted credit transaction data over a communications medium, such as the Internet. Method 800 allows status data to be requested from the remote hub system and any point of sale systems used in conjunction with the remote hub system, allows protocol modules to be transmitted for use by the remote hub system, allows encryption data to be transmitted so that the encryption process can be modified as required, and allows other suitable management data to be received and processed by the remote hub.

Although preferred and exemplary embodiments of a system and apparatus for credit transaction data transmission have been described in detail herein, those skilled in the art will also recognize that various substitutions and modifications can be made to the systems and methods without departing from the scope and spirit of the appended claims.

What is claimed is:

1. An apparatus for transmitting credit transaction data over a communications medium comprising:

protocol translator means for receiving the credit transaction data from two or more point of sale systems according to two or more different transmission protocols, each transmission protocol associated with a different credit authorization system, and forming a credit transaction data message; and encryption means for receiving the credit transaction data message from a protocol translator and encrypting the credit transaction data message.

2. The apparatus of claim 1 further comprising device router means for transmitting authorization data received in response to the credit transaction data message to the one or more point of sale systems.

3. The apparatus of claim 1 further comprising management system interface means for storing a protocol module to the protocol translator.

4. The apparatus of claim 1 further comprising management system interface means for storing an encryption module to an encryption system.

5. A method for transmitting credit transaction data over a communications medium comprising:

receiving credit transaction data from two or more point of sale devices, each reading credit card data from a magnetic stripe of a credit card;

determining a point-of-sale device data transmission protocol to use to assemble the credit transaction data into an authorization request;

encrypting the authorization request;

transmitting the encrypted authorization request over the communications medium;

decrypting the encrypted authorization request;

determining which of two or more authorization systems is the appropriate authorization system to provide the authorization request to; and transmitting the authorization request to the appropriate authorization system.

6. The method of claim 5 wherein receiving the credit transaction data from the point of sale device comprises receiving the credit transaction data in accordance with one or more of an ISO 8583 protocol or a Visa-K protocol.

7. The method of claim 5 wherein encrypting the authorization request comprises encrypting the credit transaction data using an encryption module received from a hub manager.

8. The method of claim 5 wherein transmitting the encrypted authorization request over the communications medium comprises transmitting the encrypted data in an HTTP format.

* * * * *